(12) United States Patent
Abel et al.

(10) Patent No.: US 6,797,740 B2
(45) Date of Patent: Sep. 28, 2004

(54) RADIATION CURABLE COLORED COATING COMPOSITION

(75) Inventors: Adrianus G. M. Abel, Capelle A/D Ijssel (NL); Albert A Vries De, Utrecht (NL); Gouke D. J. Geus, Vlaardingen (NL); Johannes C Burg Van Den, Hoek Van Holland (NL); Johannes A Eekelen Van, Rozenburg (NL); Alessandro Ginocchio, Sesto San Giovanni (IT); Massimo Pizzorno, Milan (IT)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 10/321,892

(22) Filed: Dec. 17, 2002

(65) Prior Publication Data

US 2003/0169989 A1 Sep. 11, 2003

Related U.S. Application Data

(63) Continuation of application No. PCT/NL01/00465, filed on Jun. 21, 2001.
(60) Provisional application No. 60/213,348, filed on Jun. 22, 2000.

(51) Int. Cl.$^7$ ....................... C09D 11/00; C09D 163/10; G02B 6/44
(52) U.S. Cl. ............................. 522/81; 522/75; 522/12; 522/18; 522/103; 522/182; 522/181; 428/378; 385/114
(58) Field of Search ................................. 385/114, 145; 428/378; 522/8, 12, 18, 64, 92, 103, 181, 182, 148

(56) References Cited

U.S. PATENT DOCUMENTS

| 5,908,873 A | * | 6/1999 | Shustack ...................... 522/39 |
| 6,040,357 A | * | 3/2000 | Murphy et al. .............. 523/160 |
| 6,085,010 A | * | 7/2000 | Zahora et al. ............... 385/114 |
| 6,114,404 A | * | 9/2000 | Deeken et al. ................. 522/88 |
| 6,197,422 B1 | * | 3/2001 | Murphy et al. .............. 428/378 |
| 2001/0008906 A1 | * | 7/2001 | Chawla ........................ 522/90 |

FOREIGN PATENT DOCUMENTS

| WO | WO 98/50317 A | 11/1998 |

* cited by examiner

*Primary Examiner*—Susan Berman
(74) *Attorney, Agent, or Firm*—Leydig, Voit & Mayer, Ltd.

(57) ABSTRACT

The invention relates to a radiation curable colored coating composition for coloring a coated optical fiber wherein the coating, when disposed and cured to surround an optical fiber coated with an internal coating, and when said colored fiber is coated with a matrix material and assembled into an optical fiber ribbon, said colored coating has a degree of adhesion to the internal coating which is higher than the degree of adhesion to the matrix material and said optical fiber assembled into said optical fiber ribbon shows, upon aging for at least two weeks in water at 60° C., an increase in the attenuation of the transmitted signal at 1550 nm of less than 0.05 db/km with respect to the attenuation of the assembled optical fiber measured before aging. The invention also relates to said colored coating composition when used in an optical fiber ribbon.

27 Claims, No Drawings

RADIATION CURABLE COLORED COATING COMPOSITION

BACKGROUND OF THE INVENTION

The invention relates to a radiation curable colored coating composition and to said colored coating composition when applied to a coated optical fiber or when applied to at least one of a plurality of coated optical fibers assembled together in a ribbon.

Optical glass fibers are generally coated with two superposed radiation-cured coating layers, which together form the so-called primary coating or primary coating system. The coating layer (more briefly "coating") which is in direct contact with the glass is called the inner primary coating and the overlaying coating, which is on the exposed surface of the coated fiber, is called the outer primary coating. The inner primary coating may also be called the primary coating; then, the outer primary coating is called the secondary coating. Both definitions are used interchangeably.

The inner primary coating is usually a relatively soft material while the outer primary coating is a relatively harder material. The primary coating system is designed to provide environmental protection to the glass fiber and resistance, inter alia, to the well-known phenomenon of microbending, which can lead to attenuation of the signal transmission capability of the fiber and is therefore undesirable. In addition, the primary coating system is designed to provide the desired resistance to physical handling forces, such as those encountered when the fiber is submitted to cabling operations.

In general, the primary coating system is applied onto the optical fiber during the drawing manufacturing process of the optical fiber.

In telecommunications applications of optical fibers, multiple individual strands of coated fiber can be packaged into larger structures such as ribbons and cables, to maximize efficiency. However, after ribboning and cabling of fiber, the individual strands of fiber must be readily distinguishable from each other so they can be accurately identified during, for example, installation and repair. Cable geometry and/or color coding can be used to distinguish and identify individual fibers in a complex cable.

Although several methods can be used to color code fiber, color coding can be done advantageously with either a thin colored layer (about 10 microns or less), also called an ink composition, which is placed over the primary coated fiber before cabling and/or ribboning of the same or by applying a colored outer primary coating onto the inner primary coating.

Typically, the application of the colored outer primary coating onto the inner primary coating takes place during the drawing process of the optical fiber. On the other side, the application of a colored layer onto the primary coated optical fiber generally takes place on a separate manufacturing line, after the primary coated optical fiber has been produced.

For the sake of conciseness, in the following of the present specification the term "internal coating" will indicate a coating disposed to surround the glass portion of the optical fiber, thus comprising either an "inner primary coating" or a "primary coating system" (i.e. comprised of an inner and an outer primary coating). Said internal coating is then in turn coated with a colored coating. The terms "colored coating composition", "colored layer", "ink layer" and "ink composition" are used interchangeably throughout the specification.

Tape-like optical fiber ribbons are prepared by embedding at least two individual color coded fibers in a supporting matrix material which, like the inner and outer primary coatings, is also radiation-curable to maximize production speed. Optical fiber ribbons may comprise e.g., 4 to 12 colored fibers. The matrix material can encase the color coded optical glass fiber or the matrix material can edge-bond the glass fibers together. Cure of the matrix material occurs during the ribboning stage after the fibers have been color-coded by applying a colored coating. Hence, in a ribbon design, the ink layer resides between the ribbon's matrix material and the fibers' outer primary coating.

This means that the ink layer's interfacial characteristics (e.g., surface energy, adhesion) must be carefully controlled to function properly with both matrix material and outer primary coating in the ribbon structure. In particular, the ability of a cured matrix material to be suitably stripped off the ink layer (break-out) is an important technical consideration. Ribbon break-out is generally carried out by a mechanical force, although chemical softening of the matrix with use of solvents is also known.

Optical fiber color coding can be based on up to 12 or more colors. Although optical fiber inks were originally solvent-based or thermosetting inks, in more recent times, radiation-curable inks have been used to increase the speed of the inking process. In these ink compositions, pigment is dispersed in a radiation-curable carrier or base composition.

As the demand for coated optical glass fibers has increased, manufacturers must respond by adding more fiber drawing production lines and by attempting to increase the linear line speeds of the existing fiber drawing/coloring production lines. In the latter case, one factor which will determine the upper limit for the line speed will be the curing rate characteristics of the radiation-curable ink composition, for a given radiation source and intensity.

If the line speed is increased to the extent that cure rate time requirements of the radiation curable ink composition are not provided, the radiation curable ink composition will not have received a sufficient amount of radiation to cause complete cure, or cross-linking, of the radiation-curable ink composition.

The production linear line speed is generally inversely related to the amount of radiation striking the optical glass fiber. That is, as the production line speed is increased, the amount of radiation exposure to the radiation-curable ink composition during the production process will necessarily decrease for a given radiation source. Incomplete cure of the radiation-curable ink composition is undesirable and must be avoided because then the desired properties of the ink coating may not be achieved and/or the incompletely cured ink coating may retain tackiness (giving problems in subsequent handling) or a malodorous odor may be present, and there may also be an undesirable increase of extractable components in the supposedly-cured ink coating.

In general, radiation-curable ink coating compositions cure at a significantly slower rate than radiation-curable outer primary coating compositions.

It is believed that the pigments present in ink compositions contribute to the slower cure speed of ink coatings. Thus, there is a need for improving the cure speed of the ink.

While the ink composition must have a very fast cure speed to ensure complete cure of the ink coating on the high speed drawing/coloring lines, the increase in cure speed should not come at the expense of other important properties of the ink coating, such as that providing suitable break-out performance. Break-out performance is the ability of the cured ink coating to separate from the matrix material without separating the ink layer from the outer primary coating, to provide an easy access to the individual coated optical glass fibers contained within the ribbon assembly, for instance during cabling/connection operations of the optical fibers.

Therefore, a radiation-curable ink composition should preferably exhibit adaptable adhesion properties to provide an adhesion between the outer primary coating and the ink coating that is greater than the adhesion between the ink coating and the matrix material to provide easy fiber access.

International Patent application Publication No. WO 98/50317 discloses a ribbon assembly comprising a colored optical fiber, wherein the colored coating of said optical fiber is formed from a radiation curable system which contains a mixture of oligomers, monomers and at least one photoinitiator, selected in such a way as to provide a level of adhesion between the ink coating and the matrix material which is less than the level of adhesion between said ink coating and the underlying inner coating of the optical fiber.

Patent application EP-A-614099 describes the use of a release agent such as a silicon oil or a fluororesin between the bundling layer and the coloring layer. In particular, when substantial amounts of silicone resins are used, incompatibility in the liquid and imperfections in the cured matrix composition may result, which causes attenuation of light.

Published Japanese patent application JP-A-01022976 describes a radiation curable ink composition comprising an alkoxylated bisphenol A diacrylate oligomer, a trifunctional reactive diluent and a homolytic photoinitiator.

SUMMARY OF THE INVENTION

The Applicant has now observed that, while some of the known ink compositions may satisfy the above different adhesion requirements, these inks generally have an insufficient resistance to water, in particular when a ribbon comprising the coated and inked optical fibers is soaked in water for a relatively long period of time. This characteristic is further called in the present specification the "water soak resistance" of a fiber. Other of the known ink compositions, which may show the desired water soak resistance do not however fulfill the adhesion requirements.

In the present application, water soak resistance is referred to the capability of the fiber to maintain substantially unaltered its optical and mechanical parameters upon exposure to water. This property can advantageously be determined by measuring the variation of the attenuation value of the signal transmitted through an optical fiber immersed in water. In the following, when referring to the water soak properties of an optical fiber, the term "optical fiber" includes within its meaning either an optical fiber as such or an optical fiber disposed within a matrix material to form a ribbon of fibers. According to what is observed by the Applicant, fibers having good water soak properties are those wherein the attenuation value is substantially constant in time when the fiber is immersed in water at a predetermined temperature and for a predetermined time.

In particular, the variation of the measured attenuation value should be less than about 0.05 db/km for at least two weeks when the fiber is immersed into water at a temperature of 60° C. As a matter of fact, as observed by the Applicant, fibers showing an increase of more than 0.05 db/km within less than two weeks of testing can not guarantee reliable optical performances during their entire operating life.

Although not wishing to be bound by any particular theory, it is believed that the increase in the attenuation value of an optical fiber immersed in water can be correlated to the fact that water may penetrate at the interface between two coating layers, thus determining possible microbending phenomena which may cause an increase in the attenuation of the transmitted signal.

The Applicant has further observed that while a fiber coated with a colored layer may show good water soak performances when tested as a single fiber, the same fiber may have unacceptable properties when coated with a matrix material to form an optical fiber ribbon. As observed by the Applicant, the interface between the colored layer and the matrix layer is thus the most critical interface for the water soak properties of optical fiber ribbons. Therefore, a relative good adhesion between the colored layer and the matrix layer should be achieved and maintained during the entire operating life of the optical fiber, in order to avoid water penetration at the interface of these two layers.

There is thus an apparent incompatibility between the requirement of good release properties and the requirement of good water soak properties. While the first property requires a relatively low degree of adhesion between the colored layer and the matrix, the second property requires a rather good adhesion between the two layers, which would not be affected by decay due to water presence.

Having recognized the above problem, the Applicant has now found that it is possible to optimize the release properties and the water soak properties of the optical fiber, in particular when said optical fiber is disposed within an optical fiber ribbon, by suitably formulating the composition of the resin which is applied as the colored coating in order to achieve acceptable values of both these properties.

One aspect of the present invention thus relates to a radiation curable colored coating composition for coloring a coated optical fiber wherein the coating, when disposed and cured to surround an optical fiber coated with an internal coating, and when said colored fiber is coated with a matrix material and assembled into an optical fiber ribbon:

said colored coating has a degree of adhesion to the internal coating which is higher than the degree of adhesion to the matrix material;

and said optical fiber assembled into said optical fiber ribbon shows, upon aging for at least two weeks in water at 60° C., an increase in the attenuation of the transmitted signal at 1550 nm of less than 0.05 db/km with respect to the attenuation of the assembled optical fiber measured before aging.

A further aspect of the present invention relates to a colored coating composition for coloring a coated optical fiber wherein the coating, when disposed and cured to surround an optical fiber coated with an internal coating, and when a plurality of said colored fibers are bound together by a matrix material to form an optical fiber ribbon, said colored coating layer has a degree of adhesion to the internal coating which is higher than the degree of adhesion to the matrix material, said degree of adhesion to the matrix material being however sufficiently high such that said optical fibers show, upon aging for at least 2 weeks in water at 60° C., an increase in the attenuation of the transmitted signal at 1550 nm of less than 0.05 db/km with respect to the attenuation of the optical fibers measured before aging.

Preferably, the increase in the attenuation of the transmitted signal at 1550 nm is less than about 0.05 db/km, upon aging of the assembled fiber for at least one month in water at 60° C. More preferably, the fiber is aged in water at 60°

C. for at least two months without showing said attenuation's increase, particularly preferred being an aging of at least four months without showing said attenuation's increase.

Preferably, said internal coating comprises an inner primary coating and an outer primary coating and the colored coating has a thickness of from about 3 to about 10 microns.

A further aspect of the present invention relates to a radiation curable colored coating composition comprising:
- (A) 40–60% by weight of a bisphenol A epoxy diacrylate, a modified bisphenol A epoxy diacrylate or a mixture of both,
- (B1) 15–30% by weight of an alkoxylated aliphatic glycol diacrylate diluent,
- (B2–5–25% by weight of a trifunctional acrylate diluent,
- (C) 6–20% by weight of a photoinitiator system consisting of at least two different homolytic free-radical photoinitiators, and less than 4% by weight of benzophenone
- (D) 1–9% by weight of a polydimethylsiloxane based silicone release agent, and
- (E) 1–15% by weight of a dry pigment, and comprising less than 5% by weight of a urethane acrylate, wherein, if an optical fiber is coated with an internal coating and with said colored coating, and if said colored fiber is coated with a matrix material and assembled into an optical fiber ribbon, said optical fiber shows, upon aging for at least two weeks in water at 60° C., an increase in the attenuation of the transmitted signal at 1550 nm of less than 0.05 db/km with respect to the attenuation of the assembled optical fiber measured before aging.

Preferably, the two homolytic free-radical photoinitiators of component (C) of said radiation-curable colored coating composition differ in their respective photosensitivity.

Preferably, said radiation curable colored coating composition further comprises less than 3% by weight of N-vinyl caprolactam.

Preferably, said radiation curable colored coating composition comprises as the trifunctional acrylate diluent (B2) trimethylol propane triacrylate.

According to a particularly preferred embodiment of the present invention said radiation curable colored coating composition consists essentially of:
- (A) 40–60% by weight of a bisphenol A epoxy diacrylate, a modified bisphenol A epoxy diacrylate or a mixture of both,
- (B1) 15–30% by weight of an alkoxylated aliphatic glycol diacrylate diluent,
- (B2) 5–25% by weight of trimethylol propane triacrylate,
- (C) 6–20% by weight of a photoinitiator system consisting of at least two different homolytic free-radical photoinitiators, and less than 4% by weight of benzophenone
- (D) 1–9% by weight of a polydimethylsiloxane based silicone release agent, and
- (E) 1–15% by weight of a dry pigment.

Preferably, the alkoxylated aliphatic glycol diacrylate diluent (B1) of said radiation curable colored coating composition is ethoxylated aliphatic glycol diacrylate.

Further, component (D) of said radiation curable colored coating composition preferably is a non-reactive polydimethyl siloxane based silicone release agent.

DETAILED DESCRIPTION OF THE INVENTION

Radiation-curable carrier systems which are suitable for forming the present ink composition contain one or more radiation-curable oligomers or monomers having at least one functional group capable of polymerization when exposed to actinic radiation. Suitable radiation-curable oligomers or monomers are now well known and within the skill of the art. Commonly, the radiation-curable functionality used is ethylenic unsaturation, which can be polymerized preferably through radical polymerization. Preferably, at least about 80 mole %, more preferably, at least about 90 mole %, and most preferably substantially all of the radiation-curable functional groups present in the oligomer are acrylate or methacrylate. For the sake of simplicity, the term "acrylate" as used throughout the present application covers both acrylate and methacrylate functionality.

A suitable radiation-curable ink composition essentially consists of from about 1 to about 80 weight % of at least one radiation curable oligomer (A). Preferred amounts of the radiation curable oligomer include from about 20 to about 70% by weight, based on the total weight of the ink composition.

A mixture of mono-, di-, tri-, tetra-, and higher functionalized oligomers can be used to achieve the desired balance of properties, wherein the functionalization refers to the number of radiation curable functional groups present in the oligomer. The oligomers usually comprise a carbon-containing backbone structure to which the radiation curable functional group(s) are bound.

Examples of suitable carbon-containing backbones include polyethers, polyolefins, polyesters, polyamides, polycarbonates and polyacrylates. The size of the carbon-containing backbone can be selected to provide the desired molecular weight. The number average molecular weight of the oligomer is usually between about 500 to about 10,000, preferably between about 500 to about 7,000, and most preferably between about 1,000 to about 5,000.

For example, the carbon-containing backbone of the oligomer can comprise aromatic groups and ring opened epoxy groups or alkoxy groups. The oligomer can be represented by, for example:

R—Ar—R; or
R—L—Ar—L—R where R is a radiation-curable functional group, Ar is an aromatic group containing moiety, and L is a linking group.

Examples of suitable linking groups include alkoxy or ring opened epoxy such as ethoxy, propoxy, butoxy, and repeat units thereof. L can also be a urethane or urea linking group, but preferably there is substantially no urethane or urea group present, in particular, less than about 5% by weight, more preferably less than about 3% by weight.

The aromatic groups can be, for example, derived from bisphenol units, such as bisphenol A or bisphenol F.

A preferred oligomer is a diglycidyl ether derivative of bisphenol A to which acrylate functional groups have been bound.

In a preferred embodiment of the present invention, the radiation-curable oligomer (A) according to the present invention is any oligomer comprising an ethylenically unsaturated group which is substantially free of urethane acrylates and is rich in epoxy acrylates. Preferably, the oligomer is a bisphenol A epoxy diacrylate.

The amount of oligomer is preferably from about 30% by weight to about 70% by weight, more preferably from about 40% by weight to about 60% by weight based on the total weight of the colored photo curable composition.

Further to the above indicated conventional oligomers, the Applicant has found that particularly valuable adhesion properties of the colored layer can be obtained when said colored layer comprises a modified bisphenol A epoxy diacrylate, said modification being capable of increasing the hydrophobicity and/or adhesion characteristics of the colored coating to the internal coating. Said modified bisphenol A epoxy diacrylate is preferably a fatty acid modified bisphenol A epoxy diacrylate. According to a particularly preferred embodiment, the oligomer of said colored composition is a mixture of bisphenol A epoxy diacrylate and of modified bisphenol A epoxy diacrylate, the ratio between the unmodified and modified bisphenol A epoxy diacrylate being from about 0.8:1 to about 1:1. According to another preferred embodiment, the ratio between unmodified and modified bisphenol A epoxy diacrylate is from about 2.4:1 to about 2.2:1, more preferred, about 2.3:1, by which a colored layer having an improved balance of properties can be achieved. In particular, a colored layer having an improved MEK resistance can be achieved.

Commercially available example of bisphenol A epoxy diacrylate is Ebecryl 3700 (UCB) or CN-120 (Sartomer), the latter having a molecular weight of about 1300, and when cured has a $T_g$ of about 65° C. Modified bisphenol A epoxy diacrylates are available e.g. as Ebecryl 3702 (UCB), when cured having a Tg of about 56° C. and CN-116 (Sartomer).

The radiation-curable carrier systems may also contain one or more reactive diluents (B) which are used to adjust the viscosity. The reactive diluent can be a low viscosity monomer having at least one functional group capable of polymerization when exposed to actinic radiation. This functional group may be of the same nature as that used in the radiation-curable oligomer. Preferably; the functional group of each reactive diluent is capable of copolymerizing with the radiation-curable functional group present on the other radiation-curable diluents or oligomer. The reactive diluents used can be mono- and/or multifunctional, preferably (meth)acrylate functional.

A suitable radiation-curable ink composition comprises from about 1 to about 80 weight % of at least one radiation-curable diluent. Preferred amounts of the radiation-curable diluent include from about 10 to about 60% by weight, more preferably from about 20 to about 55% by weight, based on the total weight of the ink composition.

Generally, each reactive diluent has a molecular weight of less than about 550 and a viscosity of less than about 500 mPa.s For example, the reactive diluent can be a monomer or a mixture of monomers having an acrylate or vinyl ether functionality and a $C_4$–$C_{20}$ alkyl or polyether moiety. Preferably, there is substantially no monoacrylate present, but there can be non-acrylate functional monomer diluents present, which are capable of reacting with the radiation-curable functional group present on the radiation-curable monomer or oligomer. Examples of such non-acrylate functional monomer diluents are N-vinylpyrrolidone, N-vinyl caprolactam and the like.

These N-vinyl monomers preferably are present in amounts between about 1 and about 20% by weight, more preferably less than about 10% by weight.

The reactive diluent can also comprise a diluent having two or more functional groups capable of polymerization. Examples of such monomers include:

$C_2$–$C_{18}$ hydrocarbondiol diacrylates,
$C_4$–$C_{18}$ hydrocarbon divinylethers,
$C_3$–$C_{18}$ hydrocarbon triacrylates, and the polyether analogues thereof, and the like, such as 1,6-hexanedioldiacrylate,
trimethylolpropane triacrylate,
hexanediol divinylether,
triethyleneglycol diacrylate,
pentaerythritol triacrylate,
ethoxylated bisphenol-A diacrylate, and
tripropyleneglycol diacrylate.

Such multifunctional reactive diluents are preferably (meth)acrylate functional, preferably difunctional (component (B1)) and trifunctional (component (B2)).

Preferably, alkoxylated aliphatic polyacrylates are used, such as ethoxylated hexanedioldiacrylate, propoxylated glyceryl triacrylate or propoxylated trimethylol-propane triacrylate.

Preferred examples of diacrylates are alkoxylated aliphatic glycol diacrylate, more preferably, propoxylated aliphatic glycol diacrylate, particularly preferable, propoxylated neopentyl glycol diacrylate.

A preferred example of a triacrylate is trimethylol propane triacrylate.

Examples of higher functional reactive diluents are cited above.

The photoinitiators used in the ink composition of the present invention preferably are free-radical photoinitiators such as Norrish Type I and Type II photoinitiators.

At least one of the photoinitiators (C) used in the ink coating composition of the present invention is a homolytic fragmentation photoinitiator (also called a Norrish Type I photoinitiator) which operates by intramolecular bond cleavage.

Examples of suitable Type I (homolytic) photoinitiators are benzoin derivatives, methylolbenzoin and 4-benzoyl-1, 3-dioxolane derivatives, benzilketals, ($\alpha$,$\alpha$-dialkoxy-acetophenones, ($\alpha$-hydroxy alkylphenones, ($\alpha$-amino-alkylphenones, acylphosphine oxides, acylphosphine sulphides, o-acyl-$\alpha$-oximinoketones, halogenated acetophenone derivatives, and benzoyl diaryl phosphine oxides.

Commercial examples of suitable Type I photoinitiators are Darocur 1173 (2-hydroxy-2-methyl-1-phenylpropane-I-one as the active component), Irgacure 184 (hydroxy-cyclohexyl phenyl ketone as the active component), Irgacure 907 (2-methyl-I-[4-methylthio)phenyl]-2-morpholino propan-I-one), Irgacure 369 (2-benzyl-2-dimethylamino-I (morpholinophenyl)-butanone-1 as the active component), acylphosphines such as Lucirin TPO by BASF (2,4,6-trimethylbenzoyl-diphenyl-phosphine oxide) or Irgacure 1700 by Ciba Geigy (bis(2,6-dimethoxy-benzoyl)-2,4,4-trimethylpentyl phosphine oxide).

Also mixtures of Type I photoinitiators can be used.

Examples of suitable Type-II (hydrogen abstraction) photoinitiators are aromatic ketones such as benzophenone, xanthone, derivatives of benzophenone, Michler's ketone, thioxanthone and other xanthone derivatives like ITX (isopropyl thioxanthone), and the like. Chemical derivatives and combinations of these photoinitiators can also be used. Preferably, benzophenone is present in an amount of less than about 4% by weight, more preferably, less than about 3% by weight, particularly preferred less than about 2.5% by weight.

Type-II photoinitiators generally are used with an amine synergist. However, the ink composition according to the present invention contains substantially no amine synergists, preferably in an amount of less than about 1% by weight, and more preferably less than about 0.1% by weight.

The radiation-curable ink composition of the present invention comprises from about 6 to about 20% by weight of a photoinitiating system (C). Preferably, said photoinitiating system (C) comprises at least two different homolytic photoinitiators, more preferably three homolytic photoinitiators. Preferably, the at least two homolytic photoinitiators of the photoinitiator system (C) differ in their respective photosensitivity.

Preferred amounts of the homolytic photoinitiator are from about 8 to about 10% by weight, more preferred, from about 6 to about 8% by weight.

For an optimum cure speed in the presence of pigment, it is advantageous to combine an acyl phosphine oxide photoinitiator with one or more other photoinitiators, such as 2-methyl-1-[4-methylthio)phenyl]-2-morpholino propan-I-one and/or 2-hydroxy-2-methyl-1-phenylpropane-I-one.

Any inorganic and organic pigment (E) that is suitable for making radiation-curable ink compositions can be used in the present invention. The preferred pigments are pigments that absorb light of a visible wavelength, i.e. any color except pure white.

The use of the term "pigment" refers to both inorganic and organic pigments.

Preferably, the pigment used in the ink coating composition of the present invention is an organic pigment. The pigment can be present in the ink composition in an amount that provides coloration that is visible without magnification to facilitate identification of the individual colored optical glass fiber.

Ribbon assemblies utilizing 12 or less coated optical glass fibers require only 12 colors to adequately distinguish each of the coated optical fibers from one another. However, in larger ribbon assemblies, more than 12 colors may be utilized to adequately distinguish the coated optical glass fibers from one another. Examples of twelve colors normally used for making ribbon assemblies include: black, white, yellow, blue, red, green, orange, brown, pink, aqua, violet, and gray.

Preferably, the pigment has a mean particle size of not more than about 1 $\mu$m. The particle size of the commercial pigments can be lowered by milling, if necessary.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines, preferably, copper(II) phthalocyanine.

Specific examples of suitable red pigments include anthraquinone (red), napthole red, monoazo based pigments, quinacridone pigments, anthraquinone, and perylenes. Preferably, perylene red is used.

Specific examples of suitable green pigments include phthalocyanine green and nitroso based pigments. Specific examples of suitable orange pigments include monoazo and diazo based pigments, quinacridone pigments, anthraquinones and perylenes.

Specific examples of suitable violet pigments include quinacrinode violet, basic dye pigments and carbazole dioxazine based pigments. Preferably, quinacridone violet is used.

Suitable aqua, brown, gray, and pink colors can easily be formulated by combining several pigments.

One skilled in the art is able to form any color as desired by combining different pigments.

The pigment can be present in the ink composition in an amount that provides coloration that is visible without magnification to facilitate identification of the individual colored optical glass fiber. The amount of pigment referred to in the present specification refers to the amount of dry pigment.

The amount of the pigment should not be so great as to significantly reduce the cure speed of the ink composition or result in other undesirable effects.

Examples of suitable amounts of pigment have been found to be higher than about 1 weight % of the total weight of the composition. Generally, the amount is less than 25 weight %, preferably less than about 15 weight %, more preferably less than about 10 weight %, based on the total weight of the ink composition.

Preferred amounts of each pigment are from about 0.5 to about 15% by weight, more preferably from about 1 to about 10% by weight, particularly preferred, from about 3 to about 8% by weight.

Coated optical fibers are often used in ribbon assemblies. Because of the versatility of the presently invented ink composition, this composition is very well suited for use on coated optical glass fibers in ribbon assemblies. A release agent (D) can thus advantageously be added to the ink coating to allow easy access to the individual fibers by separating the matrix material from the ink coating, thus improving the so-called fiber break-out properties.

As a release agent (D) reactive or non-reactive silicone release agents can be used, where reactive silicones comprise silicones having a reactive group, e.g. an acrylate function, capable of reacting with the functional groups of the oligomers and/or monomer diluents forming the photo curable composition. Also non-reactive release agents can be used. Preferably, the silicone release agent is organo modified. Preferably polymeric silicone release agents, such as polyether based silicone release agents. Component (D) can be present in amounts between about 1 and about 9% by weight, preferably between about 1.5 and about 6% by weight, particularly preferred between about 2 and about 5% by weight. Examples of suitable non-reactive release agents are polydimethyl siloxane based silicone release agents. According to a preferred embodiment of the present invention, the amount of silicone release agent is sufficient to obtain good release properties but sufficiently low to preclude failure in the 60° C. water soak test.

In particular, the Applicant has found that when the base oligomer is substantially free from urethane acrylate compounds and comprises a bisphenol A epoxy diacrylate or, preferably, a fatty acid modified bisphenol A epoxy acrylate or a mixture thereof, the above preferred release agents can be present in relative high amounts (up to 9% by weight) into the photo curable composition, without negatively affecting the final mechanical properties of the cured resin. On the other side, the Applicant has observed that if urethane acrylate oligomers are present in amounts higher than about 5% by weight in the photo curable composition, said high amounts of release agent may result in undesirable de-mixing phenomena in the composition. Commercial examples of non-reactive polymeric silicone release agents are CoatOSil 3500 and CoatOSil 3501, supplied by CK Witco, DC 57, DC 190, and DC 193, supplied by Dow Corning, and Byk333 supplied by Byk. Other additives which can be used in the radiation-curable carrier system include, but are not limited to, lubricants, wetting agents, antioxidants and stabilizers. The selection and use of such further additives is within the skill of the art.

The colored coating generally has a Tg of at least about 30° C., more preferably at least 50° C.

Colored optical fibers according to the present invention can be manufactured according to conventional manufacturing techniques.

The colored coating compositions according to the present invention are particularly suitable for being applied at high speed, e.g. at about 1000 m/min and up to about 2000 m/min. For instance, colored optical fibers according to the present invention can be produced by applying the colored coating layer at a line speed of about 1000 m/min using two 300 w/inch, 10 inches length, 9 mm D type bulb lamps or at a line speed of about 1770 m/min using two 600 w/inch, 10 inches length, 11 mm D type bulb lamps.

When applied onto a primary coating system comprising an inner and an outer primary coating, the colored coating typically has a thickness of from about 3 µm to about 10 µm. In general, the application of the colored layer takes place within one month from the application of the primary coating onto the optical fiber.

The so obtained optical fibers can be used as such for the manufacture of optical fiber cables or they may advantageously be used for manufacturing optical fiber ribbons, by edge-bonding or preferably by encasing the optical fibers into a matrix material.

Suitable matrix materials for manufacturing an optical fiber ribbon comprising a colored optical fiber according to the present invention are those known in the art. The matrix material is generally obtained by curing a radiation-curable composition comprising oligomers and monomer diluents having at least one functional group capable of polymerization when exposed to actinic radiation. Suitable radiation-curable oligomers or monomers are now well known and within the skill of the art. Commonly, the radiation-curable functionality used is ethylenic unsaturation, which can be polymerized preferably through radical polymerization. Examples of radiation-curable compositions suitable for being applied as matrix material are disclosed, for instance, in U.S. Pat. Nos. 4,844,604, 5,881,194, and 5,908,873 which are hereby incorporated by reference.

An example of a suitable commercial matrix material for manufacturing an optical fiber ribbon comprising a colored optical fiber according to the present invention is Cablelite® 3287-9-53 (DSM Desotech).

Optical fiber ribbons can be manufactured according to conventional ribboning methods, which include the single stage process and the two stage process.

In the single stage process, also known as "tandem" process, the application of the colored layer and the ribboning of the colored fiber take place on the same coating line. The colored coating compositions according to the present invention are particularly suitable for producing optical fiber ribbons according to this method.

Thus, the fibers forming the ribbon are first passed through conventional colored coating applicators, and the colored layers are simultaneously radiation cured, e.g. by passing the fibers through two 300 w/inch, 10 inches length, 9 mm D type bulb lamps. The so colored coated optical fibers, disposed in parallel to each other, are then passed through the matrix material applicator and then the matrix material is cured, e.g. by passing the so formed ribbon through two 300 w/inch, 10 inches length, H type bulb lamps. The line speed of the tandem process is generally of about 250–300 m/min.

Alternatively, each single fiber is separately color coated in a first stage (at a speed of about 1000 or 1700 m/min, for instance) and coiled onto its relative coil bobbin. On a separate line, the fibers are then unwound from the bobbin, disposed in parallel to each other and then the matrix material is applied, e.g. at a line speed of about 250–300 m/min, for forming the fiber ribbon.

The time delay between ink and matrix application is generally from about 8 hours up to about 4–5 days.

The cure degree of a colored coating layer according to the invention is preferably of at least 80%, preferably of at least 85%, more preferably of at least 95%, said cure degree being determined by means of MICRO-FTIR technique, by determining the amount of the Reacted Acrylate Unsaturations (% RAU) in the final cross-linked resin with respect to the initial photo curable composition.

A colored optical fiber according to the present invention comprises a colored layer which, when the fiber is in turn coated with a matrix material, shows the desired optimized adhesion properties to the underlying coating layer and to the matrix material.

As previously mentioned, the adhesion of the colored layer to the underlying coating layer is sufficiently high as to avoid undesired separation of the color coded layer from the fiber, when handling of the fiber occurs. This property can be easily evaluated by means of manual tests, such as by cutting the colored layer along the fiber's length with a blade and then determining how easily the colored layer can be manually separated from the underlying coating layer.

The adhesion of the colored layer to the matrix material should instead be adequately balanced in order to meet both the requirements of good fiber break-out and of water soak resistance. Thus, on one side, said adhesion of the colored layer to the matrix material should be sufficiently low in order to allow an easy removal of the matrix material from the colored fiber, without causing separation of the colored layer. On the other side said adhesion to the matrix material should be sufficiently high for imparting the desired water soak properties to the fiber in the ribbon.

Moreover, according to a preferred embodiment of the present invention, the above desirable properties of the colored layer are adequately balanced with the requirement of achieving an acceptable solvent resistance, as measured by the MEK resistance. In order to achieve, for example, a desired MEK resistance, the radiation curable colored coating composition of the present invention preferably comprises a mixture of from about 2.4:1 to about 2.2:1, more preferred, about 2.3:1 of unmodified to modified bisphenol A epoxy diacrylate (A), and a ratio of about 1.2:1 of the alkoxylated aliphatic glycol diacrylate diluent (B1) to the trifunctional acrylate diluent (B2), and components (C) to (E). Said composition shows a preferable MEK resistance of at least about 110 double rubs, preferably, at least about 115, more preferred, at least about 120, particularly preferred, at least about 130, most preferred at least about 150 MEK double rubs.

The MEK double rub test is performed on a coated and colored optical fiber as follows. A coated optical fiber is colored with the colored coating composition of the present invention on an OFC 52 apparatus of Nextrom at a line speed of 1000 m/min under one D type bulb lamp at 100% capacity under a nitrogen purge of 40 liter per minute. Approximately 1 meter of the colored coated optical fiber is then fixed firmly onto a table with 4 pieces of tape of approximately 5 cm width (such as, for example, Scotch tape) so as to divide the fiber into three parts of approximately 15 cm. The MEK test is then performed on said three parts of the fiber (three samples per fiber). The amount of MEK double rubs is then measured as follows: a Texwipe TX 404T wipe is folded in quarters to form a folded pad, said pad is placed over the round edge of a 16-ounce (453.6 gram) hammer and secured with a small rubber band. A few drops of methyl ethyl ketone (MEK), reagent grade, are added to the pad and allowed to disperse, but not allowed to dry. The pad secured to the hammer is placed on the coated and colored fiber sample keeping the hammer's handle level and then moved approximately 6 inches (15.24 cm) along the sample keeping the handle of the hammer as level as possible and then bringing the hammer back to its starting position with the handle as level as possible. The keeping the hammer's handle level maintains a fairly consistent weight on the sample. Said action is considered one cycle, corresponding to two single rubs. A colored coating composition is said to pass if it survives a minimum of 100 MEK double rubs, The following examples are given as particular embodiments of the invention and to demonstrate the practice and advantages thereof. The examples are given by way of illustration and are not intended to limit the specification or claims.

EXAMPLE 1
Preparation of Photo Curable Colored Composition

An ink composition (of blue and red color respectively) was prepared by mixing the components of Table 1.

TABLE 1

Photo curable colored composition

| Components of ink composition | Blue (wt. %) | Red (wt. %) |
|---|---|---|
| Bisphenol A epoxy diacrylate (Mw = 524) | 24.17 | 21.38 |
| Fatty acid modified Bisphenol A epoxy diacrylate (Mw = 500) | 26.10 | 23.06 |
| Propoxylated neopentyl glycol diacrylate (Mw = 328) | 23.69 | 21.04 |
| TMPTA[1] | 8.95 | 15.59 |
| 2,4-di-tert-butyl-p-cresol (BTH) | 0.49 | 0.43 |
| Irgacure 819[2] | 0.97 | 0.87 |
| Irgacure 907[3] | 2.90 | 2.57 |
| Darocure 1173[4] | 3.86 | 3.43 |
| Benzophenone | 1.93 | 1.71 |
| CoatOSil 3500[5] | 3.30 | 3.30 |
| CoatOSil 3501[6] | 1.00 | 1.00 |
| Pigment blue: copper(II)phthalacyanine[7] | 1.04 | — |
| Pigment white: rutile titanium dioxide[7] | 1.60 | 3.82 |
| Pigment red: perylene red[7] | — | 1.33 |
| Pigment violet: quinacridone violet[7] | — | 0.48 |

[1]TMPTA is trimethylol propane triacrylate
[2]Irgacure 819 is bis-(2,4,6-trimethylbenzoyl)-phenyl-phosphine oxide (supplied by Ciba Geigy)
[3]Irgacure 907 is 2-methyl-1-[4-(methylthio)phenyl]-2-morpholino-propan-1-one (supplied by Ciba Geigy)
[4]Darocure 1173 is 2-hydroxy-2-methyl-1-phenyl-propan-1-one (supplied by Ciba Geigy)
[5]CoatOSil 3500 is a polydimethyl siloxane based silicone release agent (CK Witco)
[6]CoatOSil 3501 is a polydimethyl siloxane based silicone release agent (CK Witco)
[7]amount dry pigment as present in a pigment dispersion EXAMPLE 2
Preparation of Photo Curable Colored Composition An ink composition similar to the composition of Table 1 was prepared containing the same total amount of release agent, being a reactive silicone release agent.

EXAMPLE 3
Preparation of Photo Curable Colored Composition

An ink composition similar to the composition of Table 1 was prepared by replacing the photoinitiator package of the composition of Table 1 by a 5–6% by weight mixture of Irgacure 819 and Darocure 1173 depending on the color used. The amount of the other components was further adjusted to add up to a total amount of 100% by weight.

EXAMPLE 4
Preparation of Photo Curable Colored Composition

An ink composition similar to the composition of Table 1 was prepared by replacing the fatty acid modified Bisphenol A epoxy diacrylate oligomer with the same amount of the bisphenol A epoxy diacrylate oligomer indicated in said table, and containing as the only release agent 1% by weight of a polydimethyl siloxane based silicone, and having some N-vinyl caprolactam as a diluent. The amount of the other components was further adjusted to add up to a total amount of 100% by weight.

EXAMPLE 5
Preparation of Photo Curable Colored Composition

An ink composition similar to the composition of Table 1 was prepared by replacing the release agents by 1% by weight of CoatOSil 3501. The amount of the other components was further adjusted to add up to a total amount of 100% by weight.

Comparative Experiment A

An ink composition was prepared by mixing the components of Table 2:

TABLE 2

Photo curable colored composition

| Components of ink composition | Wt. % of total composition |
|---|---|
| Ebecryl 3700 (epoxy acrylate) | 51.0 |
| Alkoxylated aliphatic diacrylate | 30.0 |
| TMPTA | 9.0 |
| Irgacure 819 | 1.0 |
| Irgacure 907 | 3.0 |
| Benzophenone | 4.0 |
| Blue pigment (Penn Color) | 1.5 |
| BYK 333[8] | 0.5 |

[8]BYK 333 is a polyether modified dimethyl polysiloxane.

Comparative Experiment B

A commercial ink composition comprising a urethane acrylate oligomer was used.

EXAMPLE 6

Determination of adhesion of the colored layer to the fiber and cure degree at different application speed.

The above colored photo curable compositions where applied with a thickness of about 5–6 μm onto Corning® SMF-28™ CPC6 optical fibers.

The application of the ink compositions has been made at different speeds, in order to evaluate the effects of the cure speed onto the properties of the optical fibers.

In particular, the inks have been applied onto the optical fibers at a speed of 100 m/min, 250 m/min, 500 m/min or 1000 m/min using a coloring line equipped with two 300 w/inch, 10 inches length, 9 mm UV D type bulb lamps.

The curing % of each ink was measured by means of FTIR, by determining the % amount of RAU (reacted acrylate unsaturation), according to the methodology described in WO 98/50317.

The adhesion of the ink to the fibers was determined by cutting the ink layer with a knife and evaluating how easily the ink layer could be separated from the underlying coating layers by acting on the cuts' edges with the knife's blade.

The following Table 3 illustrates the results of the ink adhesion test and the curing % of the tested ink compositions. In the table, the acronym "VG" means a very good degree of ink adhesion to the fiber while "G" means good adhesion, thus indicating that the ink can not be separated by the underlying layer or only small flakes can be separated, respectively. Symbol "A" means an acceptable adhesion, thus indicating that the ink layer is sufficiently adherent to the underlying coating layer for the purposes of handling the fiber without undesired separation of the colored layer, said colored layer being nevertheless separable from the underlying coating by acting on the interface of the two layers with the knife's blade. Symbols "P" and "VP" means poor adhesion and very poor adhesion, respectively.

TABLE 3

Cure degree % of the colored layer (1) and adhesion of the colored layer to the underlying coating layer (2) at different curing speeds

| | Cure degree (1) and ink adhesion to fiber (2) | | | | | | | |
|---|---|---|---|---|---|---|---|---|
| | 100 m/min | | 250 m/min | | 500 m/min | | 1000 m/min | |
| | (1) | (2) | (1) | (2) | (1) | (2) | (1) | (2) |
| Ex. 1 | — | — | ≧95 | VG | ≧95 | VG | ≧85 | G |
| Ex. 2 | — | — | ≧95 | VG | — | — | — | — |
| Ex. 3 | — | — | ≧95 | VG | — | — | — | — |
| Ex. 4 | — | — | ≧95 | G | ≧95 | G | — | — |
| Ex. 5 | — | — | ≧95 | VG | ≧95 | VG | ≧85 | A |
| Comp. A | ≧95 | VG/G | ≧95 | G/A | — | — | — | — |
| Comp. B | — | — | — | — | ≧80 | A/P | <80 | P |

EXAMPLE 7

Determination of Water Soak Resistance on Single Fibers

The colored optical fibers manufactured according to Example 6 were tested to determine the respective water soak resistance, by measuring the variation of the attenuation of the signal transmitted through the optical fiber immersed into water at a temperature of 60° C.

1000 m of each single fiber were thus loose coiled into (coils of about 300 mm diameter), and immersed in a thermostatic vessel containing tap water at 60° C.

The optical attenuation of the fiber has been measured at 1550 nm with the back-scattering technique, using an ANRITSU mod. MW 9005C OTDR (optical time domain reflectometer). The measurements were performed each 30 minutes for the first ten days, then daily up to the end of the first month and then weekly.

Increases of less than 0.05 db/km were measured for all the tested fibers after 120 days aging in water.

EXAMPLE 8

Determination of the Fiber Break-out Properties of the Colored Layer

Optical fiber ribbons containing optical fibers having a colored layer as indicated in Example 6 were manufactured using Cablelite® 3287-9-53 (DSM Desotech) as the matrix material composition according to the following manufacturing techniques, previously described:

Tandem process (colored layer and matrix material both applied at either 100 or 250 m/min)

Two step process (colored layer applied at 1000 m/min; matrix material at 250 m/min), with a delay of about one day between the two applications.

The total thickness of the ribbon was of about 300 μm.

The ribbons manufactured according to the "tandem" process contained four optical fibers each (two with red pigment and two with blue pigment). Ribbons manufactured according to the two stage process contained 6 colored optical fibers. The determination of the fiber break-out properties has been made by manually opening the ribbon and evaluating how easily the fiber could be separated from each other and from the ribbon matrix, on a "pass/fail" basis test. A "pass" rate has thus been assigned to those fibers showing a regular fiber separation for at least about 500 mm and a removal length of the matrix material of about 50 mm, without any matrix material being left onto the fiber or any ink removal from the fiber. A "fail" rate has been assigned to those fibers not satisfying the above conditions. The results are reported in the following Table 4.

TABLE 4

| | Fiber break-out | | |
|---|---|---|---|
| | Fiber break out at | | |
| | Tandem process | | Two-step |
| INK | 100 m/min | 250 m/min | 1000 + 250 m/min |
| Ex. 1 | — | Pass | Pass |
| Ex. 2 | — | Pass | — |
| Ex. 3 | — | Pass | — |
| Ex. 4 | — | Pass | Pass |
| Comp. A | Pass | Fail | — |
| Comp. B | — | Pass | Pass |

EXAMPLE 9

Determination of Water Soak Performances on the Ribbonized Fibers 1000 m of ribbons manufactured according to Example 8 were tested to determine the water soak resistance of colored optical fibers, by measuring the variation of the attenuation of the signal transmitted through the optical fiber immersed into water at a temperature of 60° C., according to the methodology described in Example 7.

Ribbons manufactured with the matrix material mentioned in Example 8 are identified as MM1 in Table 6.

In addition, a second set of ribbons has been manufactured using an alternative matrix material, identified in Table 6 as MM2, having the composition as given in Table 5 (expressed as % by weight of components):

TABLE 5

| Matrix Composition MM2 | |
|---|---|
| Components of matrix composition MM2 | Wt. % |
| HEA-IPDI-propoxylated(n = 4)BPA-IPDI-HEA[1] | 17.92 |
| HEA-IPDI-Priplast ® 3192-IPDI-HEA[2] | 29.2 |
| Isobornyl acrylate | 29.8 |
| Ethoxylated (n = 3) trimethylol propane triacrylate | 1.55 |
| Trimethylol propane triacrylate (TMPTA) | 18.5 |
| Lucerin TPO ®[3] | 1.5 |
| Irgacure 184 ® | 1.5 |
| Irganox 1010 ®[4] | 0.03 |

[1]HEA = hydroxy ethyl acrylate; IPDI = isophorone diisocyanate; propoxylated (n = 4)bisphenol A
[2]Priplast ® 3192: dimer acid modified hexanediol diacrylate
[3]Lucerin TPO ®: 2,4,6-trimethylbenzoyl-diphenyl-phosphine oxide (supplied by BASF)
[4]Irganox 1010 ®: penta-erithrityl-tetrakis-(3-(3,5-di-tert-butyl-4-hydroxyphenyl)-propionate (manufactured by Ciba Specialty Chemicals Co.)

Fibers showing an increase in the attenuation value of 0.05 db/km or more after less than two weeks of testing are considered not acceptable. Fibers showing an increase in the attenuation value of less than about 0.05 db/km after at least two weeks of testing are considered acceptable. Fibers showing an increase in the attenuation value of less than about 0.05 db/km after at least one month of testing are preferred. Fibers showing an increase in the attenuation value of less than about 0.05 db/km after two months or more are particularly preferred. Most preferred are those fiber for which an increase in the attenuation value of less than about 0.05 db/km is measured for at least 120 days, corresponding to the maximum run time of the test.

Table 6 shows the results of these tests on ribbons manufactured by using the tandem manufacturing technique at 250 m/min or by using the two step manufacturing technique (application of colored layer at 1000 m/min and of matrix material at 250 m/min).

The value reported in table 3 refers to the day on which the first fiber of the ribbon shows (apart variations due to experimental errors) an increase of the attenuation value of more than 0.05 db/km, with respect to the initial attenuation value of the same optical fiber.

TABLE 6

Water soak test for ribbons

No. of days with variation of attenuation of less than 0.05 db/km for ribbons manufactured at

| | 250 m/min (tandem) | | 1000 + 250 m/min |
|---|---|---|---|
| | with MM1 | with MM2 | with MM1 |
| Ex. 1 | 70 | 47 | 80 |
| | >120 | 52 | 120 |
| Ex. 2 | — | 40 | — |
| Ex. 3 | — | 80 | — |
| Ex. 4 | 30 | 20 | 92 |
| | 70 | 54 | >120 |
| Comp. B | 2 | 3 | 8 |
| | 3 | 4 | |

What is claimed is:

1. A radiation curable colored coating composition for coloring a coated optical fiber wherein the coating, when disposed and cured to surround an optical fiber coated with an internal coating, and when said colored fiber is coated with a matrix material and assembled into an optical fiber ribbon:

said colored coating has a degree of adhesion to the internal coating which is higher than the degree of adhesion to the matrix material; and said optical fiber assembled into said optical fiber ribbon shows, upon aging for at least two weeks in water at 60° C., an increase in the attenuation of the transmitted signal at 1550 nm of less than 0.05 db/km with respect to the attenuation of the assembled optical fiber measured before aging; wherein said radiation curable colored coating composition contains both a difunctional acrylate diluent and a trifunctional acrylate diluent, and if a urethane acrylate is present, it is present in an amount less than 5% by weight of the composition.

2. The radiation curable colored coating composition according to claim 1, wherein the increase in the attenuation of the transmitted signal is less than about 0.05 db/km, upon aging of the assembled fiber for at least one month in water at 60° C.

3. The radiation curable colored coating composition according to claim 1, wherein the increase in the attenuation of the transmitted signal is less than about 0.05 db/km, upon aging of the assembled fiber for at least two months in water at 60° C.

4. The radiation curable colored coating composition according to claim 1, wherein said internal coating comprises an inner primary coating and an outer primary coating and the colored coating has a thickness of from about 3 to about 10 microns.

5. The radiation curable colored coating composition of claim 1, wherein benzophenone is present in an amount less than 4% by weight of the composition.

6. The radiation curable colored coating composition of claim 1, wherein benzophenone is present in an amount of 2.5% or less by weight of the composition.

7. The radiation curable colored coating composition of claim 1, wherein benzophenone is present in an amount of 1.93% or less by weight of the composition.

8. The radiation curable colored coating composition of claim 1, wherein benzophenone is present in an amount of 1.71% or less by weight of the composition.

9. A radiation curable colored coating composition comprising:
(A) 40–60% by weight of a bisphenol A epoxy diacrylate, a modified bisphenol A epoxy diacrylate or a mixture of both,
(B1) 15–30% by weight of an alkoxylated aliphatic glycol diacrylate diluent,
(B2) 5–25% by weight of a trifunctional acrylate diluent,
(C) 6–20% by weight of a photoinitiator system consisting of at least two different homolytic free-radical photoinitiators, and less than 4% by weight of benzophenone,
(D) 1–9% by weight of a polydimethylsiloxane based silicone release agent,
(E) 1–15% by weight of a dry pigment, and
(F) less than 5% by weight of a urethane acrylate, wherein, if an optical fiber is coated with an internal coating and with said colored coating, and if said colored fiber is coated with a matrix material and assembled into an optical fiber ribbon, said optical fiber assembled into said optical fiber ribbon shows, upon aging for at least two weeks in water at 60° C., an increase in the attenuation of the transmitted signal at 1550 nm of less than 0.05 db/km with respect to the attenuation of the assembled optical fiber measured before aging.

10. The radiation curable colored coating composition according to claim 9, wherein the two homolytic free-radical photoinitiators of component (C) differ in their respective photosensitivity.

11. The radiation curable colored coating composition according to claim 9 or 10, wherein the composition further comprises less than 3% by weight of N-vinyl caprolactam.

12. The radiation curable colored coating composition according to claim 11, wherein the composition comprises as the trifunctional acrylate diluent (B2) trimethylol propane triacrylate.

13. The radiation curable colored coating composition according to claim 11, wherein the alkoxylated aliphatic glycol diacrylate diluent (B1) is ethoxylated aliphatic glycol diacrylate.

14. The radiation curable colored coating composition according to claim 11, wherein component (D) is a nonreactive polydimethyl siloxane based silicone release agent.

15. The radiation curable colored coating composition according to claim 9 or 10, wherein the composition comprises as the trifunctional acrylate diluent (B2) trimethylol propane triacrylate.

16. The radiation curable colored coating composition according to claim 15, wherein the alkoxylated aliphatic glycol diacrylate diluent (B1) is ethoxylated aliphatic glycol diacrylate.

17. The radiation curable colored coating composition according to claim 15, wherein component (D) is anonreactive polydimethyl siloxane based silicone release agent.

18. The radiation curable colored coating composition of claim 9, wherein benzophenone is present in an amount of 2.5% or less by weight of the composition.

19. The radiation curable colored coating composition of claim 9, wherein benzophenone is present in an amount of 1.93% or less by weight of the composition.

20. The radiation curable colored coating composition of claim 9, wherein benzophenone is present in an amount of 1.71% or less by weight of the composition.

21. The radiation curable colored coating composition of claim 22, wherein benzophenone is present in an amount of 2.5% or less by weight of the composition.

22. A radiation curable colored coating composition consisting essentially of:
- (A) 40–60% by weight of a bisphenol A epoxy diacrylate, a modified bisphenol A epoxy diacrylate or a mixture of both.
- (B1) 15–30% by weight of an alkoxylated aliphatic glycol diacrylate diluent,
- (B2) 5–25% by weight of trimethylol propane triacrylate,
- (C) 6–20% by weight of a photoinitiator system consisting of at least two different homolytic free-radical photoinitiators, and less than 4% by weight of benzophenone,
- (D) 1–9% by weight of a polydimethylsiloxane based silicone release agent, and
- (E) 1–15% by weight of a dry pigment.

23. The radiation curable colored coating composition according to any one of claims 9, 10, and 22, wherein the alkoxylated aliphatic glycol diacrylate diluent (B1) is ethoxylated aliphatic glycol diacrylate.

24. The radiation curable colored coating composition according to any one of claims 9, 10, and 22, wherein component (D) is a non-reactive polydimethyl siloxane based silicone release agent.

25. The radiation curable colored coating composition according to claim 22, wherein the alkoxylated aliphatic glycol diacrylate diluent (B1) is ethoxylated aliphatic glycol diacrylate and wherein component (D) is a non-reactive polydimethyl siloxane based silicone release agent.

26. The radiation curable colored coating composition of claim 22, wherein benzophenone is present in an amount of 1.93% or less by weight of the composition.

27. The radiation curable colored coating composition of claim 22, wherein benzophenone is present in an amount of 1.71% or less by weight of the composition.

* * * * *